United States Patent
Abiri et al.

(10) Patent No.: US 9,775,031 B2
(45) Date of Patent: Sep. 26, 2017

(54) TECHNIQUES FOR DISCOVERY OF WI-FI SERIAL BUS AND WI-FI DOCKING SERVICES

(71) Applicant: Intel Corporation, Santa Clara, CA (US)

(72) Inventors: Roni Abiri, Raanana (IL); Paz Pentelka, Natania (IL)

(73) Assignee: INTEL CORPORATION, Santa Clara, CA (US)

(*) Notice: Subject to any disclaimer, the term of this patent is extended or adjusted under 35 U.S.C. 154(b) by 0 days.

(21) Appl. No.: 14/125,897

(22) PCT Filed: Aug. 14, 2013

(86) PCT No.: PCT/US2013/054905
§ 371 (c)(1),
(2) Date: Dec. 12, 2013

(87) PCT Pub. No.: WO2015/023273
PCT Pub. Date: Feb. 19, 2015

(65) Prior Publication Data
US 2015/0094024 A1    Apr. 2, 2015

(51) Int. Cl.
H04W 12/06   (2009.01)
H04W 76/02   (2009.01)
G06F 1/16    (2006.01)
H04M 1/725   (2006.01)

(52) U.S. Cl.
CPC .......... *H04W 12/06* (2013.01); *G06F 1/1632* (2013.01); *H04M 1/7253* (2013.01); *H04W 76/02* (2013.01); *H04M 2250/06* (2013.01); *H04M 2250/52* (2013.01)

(58) Field of Classification Search
CPC .......... H04M 1/7253; H04M 2250/16; H04M 1/0256
USPC ......................................................... 455/415
See application file for complete search history.

(56) References Cited

U.S. PATENT DOCUMENTS

| | | | |
|---|---|---|---|
| 8,826,159 B2* | 9/2014 | Nurmi | 715/764 |
| 2006/0146195 A1* | 7/2006 | Yoon | 348/587 |
| 2009/0095812 A1 | 4/2009 | Brown et al. | |
| 2009/0158039 A1 | 6/2009 | Prasad et al. | |
| 2009/0265749 A1* | 10/2009 | Yu | H04L 63/0492 725/116 |
| 2010/0082821 A1 | 4/2010 | Rosenblatt et al. | |
| 2010/0093401 A1* | 4/2010 | Moran et al. | 455/566 |
| 2011/0053558 A1* | 3/2011 | Teague | H04L 9/3273 455/411 |
| 2012/0128154 A1 | 5/2012 | Ran | |

(Continued)

OTHER PUBLICATIONS

International Search Report received for PCT Patent Application No. PCT/US13/54905, mailed Feb. 19, 2015, 3 pages.

*Primary Examiner* — Qun Shen

(57) ABSTRACT

Techniques are disclosed to automatically connect a mobile device to an external display or wireless dock by establishing a bi-directional link between the mobile device and the external display or wireless dock, receiving an image captured by the external display or wireless dock via the bi-directional link by the mobile device, and evaluating the image by the mobile device to verify that the external display or wireless dock is the intended external display or wireless dock with which to connect to the mobile device.

20 Claims, 7 Drawing Sheets

(56) References Cited

U.S. PATENT DOCUMENTS

| | | | |
|---|---|---|---|
| 2012/0176482 A1* | 7/2012 | Border | H04N 13/044 |
| | | | 348/51 |
| 2012/0287290 A1* | 11/2012 | Jain | H04L 63/18 |
| | | | 348/207.1 |
| 2013/0076918 A1* | 3/2013 | Park | H04N 1/00251 |
| | | | 348/207.11 |
| 2013/0124740 A1* | 5/2013 | Liansky | G06F 15/16 |
| | | | 709/228 |
| 2013/0208103 A1* | 8/2013 | Sands | G06F 21/31 |
| | | | 348/78 |
| 2013/0225139 A1* | 8/2013 | Moran et al. | 455/415 |
| 2015/0006669 A1* | 1/2015 | Kauffmann | H04L 67/10 |
| | | | 709/217 |

* cited by examiner

TECHNIQUES FOR DISCOVERY OF WI-FI SERIAL BUS AND WI-FI DOCKING SERVICES

TECHNICAL FIELD

Examples described herein are generally related to visual pairing and auto connecting for wireless display and wireless docking.

BACKGROUND

When Mobiles devices (Computers, tablets, phones and the like) are connected wirelessly to an external display (docking, TV or similar), there is a risk that the device will be connected to an unintended or incorrect display, thus exposing private or sensitive information. This is a major drawback compared to a cabled connection to an external display or wireless dock, where the specific display is uniquely identified by the cable.

Consequently, there are general needs for improved techniques to pair and connect to wireless displays and wireless docking.

BRIEF DESCRIPTION OF THE DRAWINGS

In the drawings, like reference numbers generally indicate identical, functionally similar, and/or structurally similar elements. The drawing in which an element first appears is indicated by the leftmost digit(s) in the reference number. The present invention will be described with reference to the accompanying drawings, wherein.

DETAILED DESCRIPTION

Figure 1:
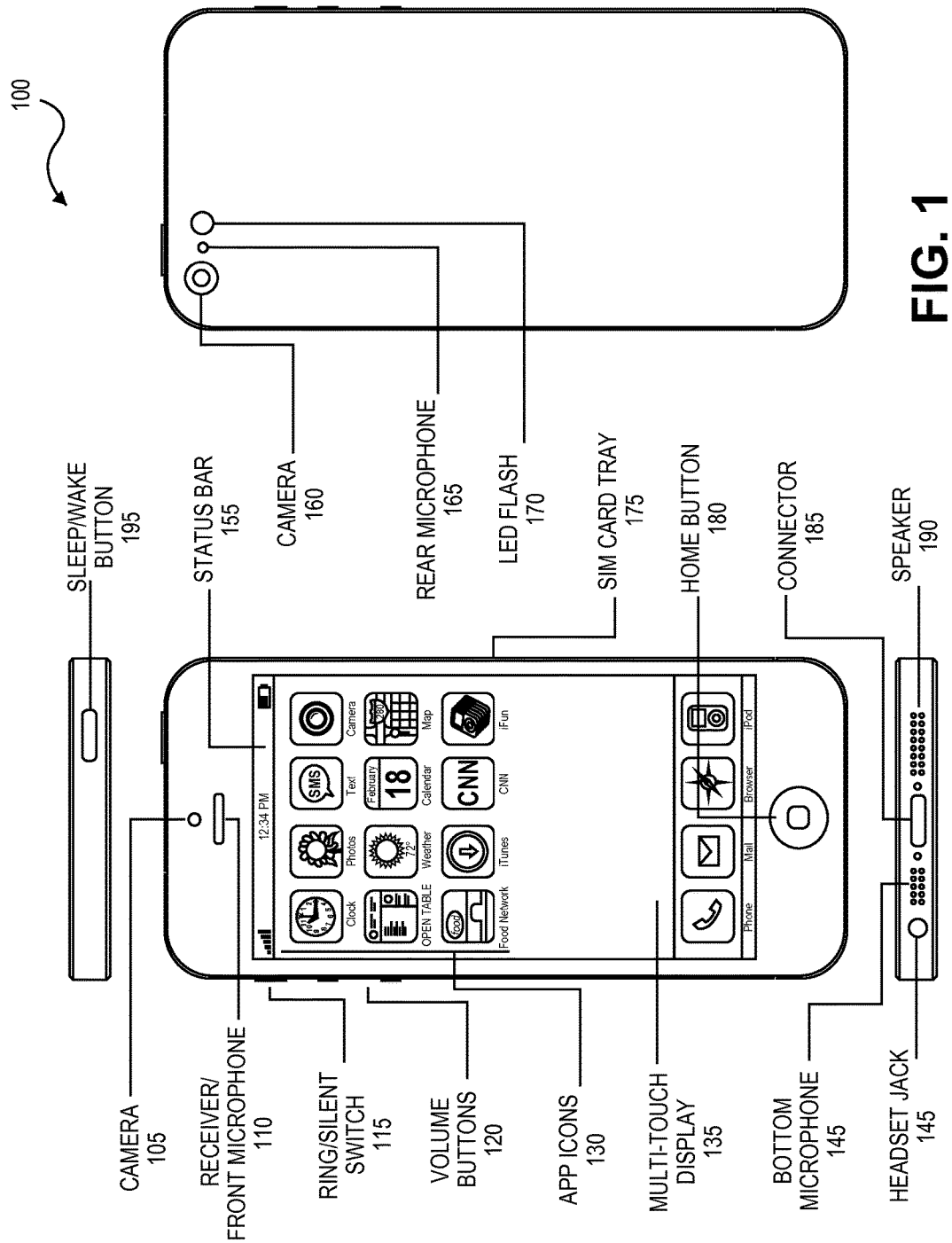
FIG. 1 is an illustration of an example smartphone that may be used with embodiments described herein.

In the following description, numerous specific details are set forth. However, it is understood that embodiments of the invention may be practiced without these specific details. In other instances, well-known methods, structures and techniques have not been shown in detail in order not to obscure an understanding of this description.

References to "one embodiment," "an embodiment," "example embodiment," "various embodiments," etc., indicate that the embodiment(s) of the invention so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Some embodiments may be used in conjunction with devices and/or networks operating in accordance with existing WiGig Serial Extension Specification Version 1.2, July 2012. Final specification. Wireless-Gigabit-Alliance (WGA) specifications (Wireless Gigabit Alliance, Inc WiGig MAC and PHY Specification Version 1.1, April 2011, Final specification) and/or future versions and/or derivatives thereof, devices and/or networks operating in accordance with existing. IEEE 802.11 standards (IEEE 802.11-2012, IEEE Standard for Information technology—Telecommunications and information exchange between systems Local and metropolitan area networks—Specific requirements Part 11: Wireless LAN Medium Access Control (MAC) and Physical Layer (PHY) Specifications, Mar. 29, 2012; IEEE802.11 task group ac (TGac) ("IEEE802.11-09/0308r12—TGac Channel Model Addendum Document"); IEEE 802.11 task group ad (TGad) (IEEE P802.11ad Standard for Information Technology—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the (60 GHz Band)) and/or future versions and/or derivatives thereof, devices and/or networks operating in accordance with existing WirelessHDTMM specifications and/or future versions and/or derivatives thereof, units and/or devices which are part of the above networks, and the like.

Embodiments described herein may use visual info nation that uniquely identifies a connected display, so it is not possible to connect by mistake to a wrong display. Although not hunted in this respect, two examples may include:

1) Face recognition using an embedded camera in the external display: the external display connects to the mobile device, but before it displays any information, it captures an image from the camera, sends it in the back channel to the mobile device and only after a successful recognition, the information is displayed on the external display.

2) External display recognition by the mobile device: the external display send coded bursts of light that are received by the embedded camera of the device for example Smartphone), and thus verifies that the right display was selected.

Previous and inadequate solutions require typing a code that appears on the external display, or physically pressing a button on it, which may be cumbersome and impact negatively user's experience for wirelessly connected displays. Another previous method is to manage a list of allowed displays which limits operation in enterprise environment where potentially the devices can be connected to any external display, such as in meeting rooms.

Embodiments herein assume that the devices are pre-paired, meaning that they are allowed to connect to each other. Alternatively the displays can be configured to be available for connection to all mobile devices. This may depend on such factors as IT policy in an organization or similar policies.

FIG. 1 is an illustration of an example smartphone 100 that may be used with embodiments described herein. Although not limited in this respect and merely to exemplify, the smartphone 100 may include a camera 105, receiver/front microphone 110, ring/silent switch 115, volume buttons 120, application icons 130, multi-touch display 135, bottom microphone 145, headset jack 145, speaker 190, external connector 185, home button 180, SIM Card tray 175, rear microphone 165, rear camera 160, status bar 166 and a sleep/wake button 195. A smartphone that may be used with embodiments herein may include some, all or additional features of the exemplified smartphone and include similar or different form factors.

Figure 2:
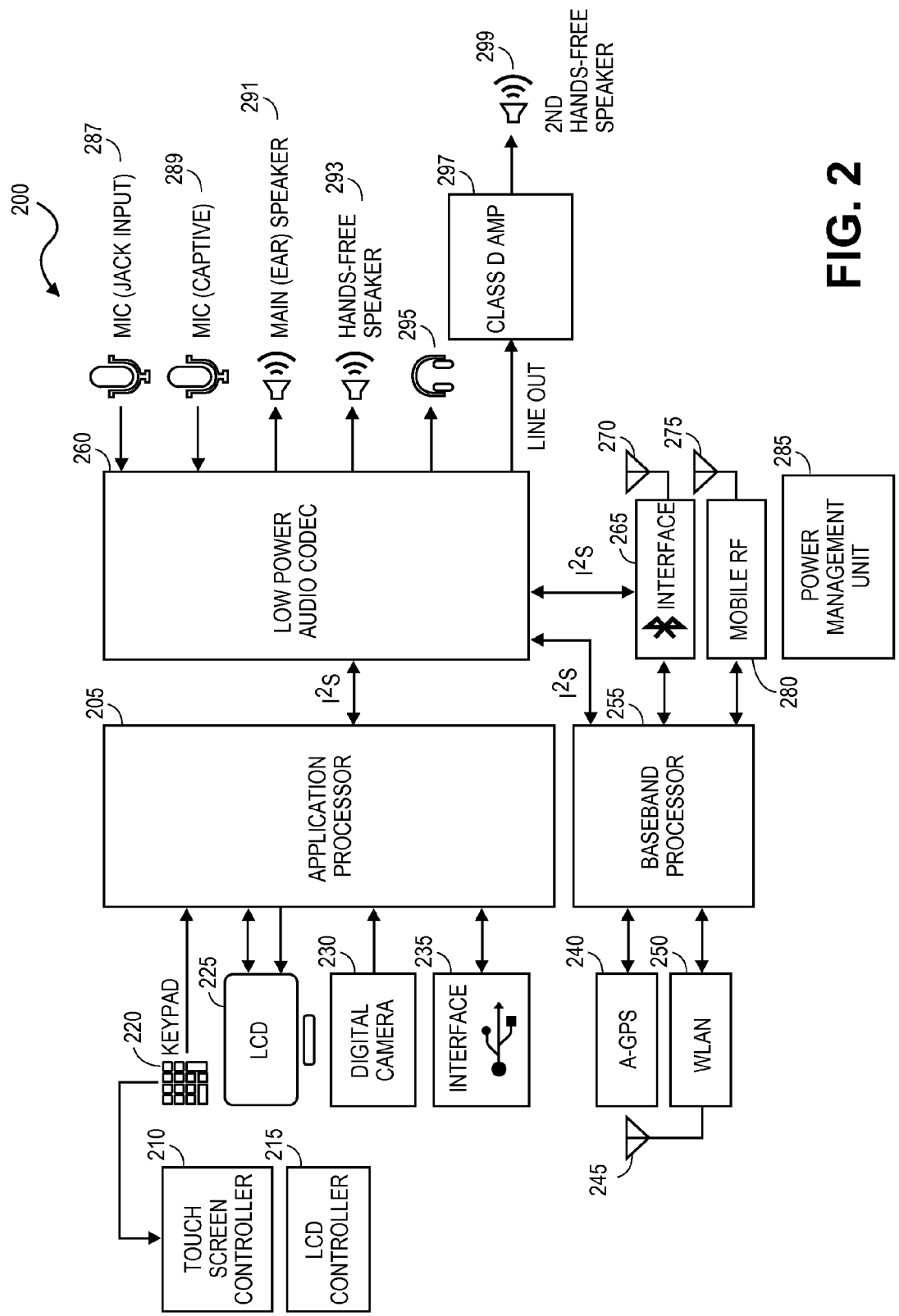
FIG. 2 illustrates possible components to provide the functionality of the smartphone to accomplish the examples described herein.

Looking now at FIG. 2, shown generally as 200, is an illustration of possible components to provide the functionality of the smartphone to accomplish the examples described herein. Application processor 205 may be interfaced with a keypad 220 which may include a touch screen controller 210. Application processor may be further interfaced with an display or screen such as LCD 225 which may include an LCD controller. Features of smartphone such as digital camera 230 may be interfaced with application processor 205 which may also be used for operating applications that may be inherent in, preinstalled or added to the smartphone 100.

A low power audio codec may be interfaced with application processor 205, which may be connected to a microphone 287, captive mic 289, main ear speaker 291, hands-free speaker 293, option headphone input 295 and a second hands-free speaker 299 via amplifier 297.

A short range wireless (e.g., Bluetooth®) interface 265 with antenna 270 may interface low power audio codec 260 with baseband processor 255. Baseband processor 255 may further be interfaced with a GPS receiver 240, wireless local area network radio 245, mobile RF radio 280 with antenna 275 and a power management unit 285.

Embodiments described below provide a pairing (association/authentication) process of establishing an initial link which may be used for setting up methods of unique identified connection. As part of the pairing process—two devices typically identify each other (there are several options doing so, for example, but not limited to a passphrase, WPS, certificates or the like).

In a first method, during this pairing process, an expected image (for example, a face) may be saved in a docking station, and when auto-connecting, verification of this image in the docking station may be accomplished to allow the auto connection.

In a second method, during pairing, a Docking station may be setup with expected coded bursts of light that will be sent as part of the auto-connection for verifying in the device.

Figure 2A:
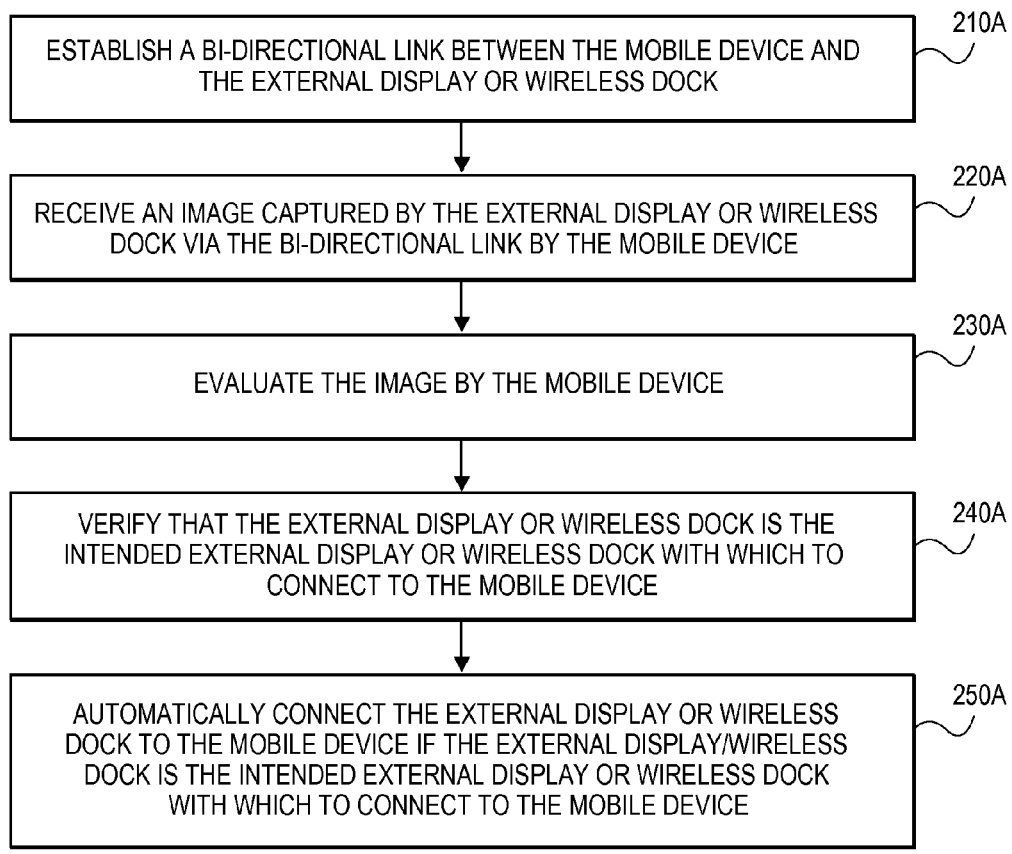
FIG. 2A illustrates a method of visual pairing and auto connecting for wireless display and wireless docking using face recognition according to embodiments illustrated herein.

As shown in FIG. 2A, embodiments of examples herein provide a method to automatically connect a mobile device 100, such as the smartphone described with reference to FIG. 1 and FIG. 2, to an external display or wireless dock by establishing a bi-directional link between the mobile device 100 and the external display or wireless dock 210A, receiving an image captured by the external display or wireless dock via the bi-directional link by the mobile device 100 220A, and evaluating the image by the mobile device 100 230A and verifying that the external display or wireless dock is the intended external display or wireless dock with which to connect to the mobile device 100 240A. At 250A, automatically connecting the external display or wireless dock to the mobile device if the external display/wireless dock is the intended external display or wireless dock with which to connect to the mobile device.

Figure 2B:
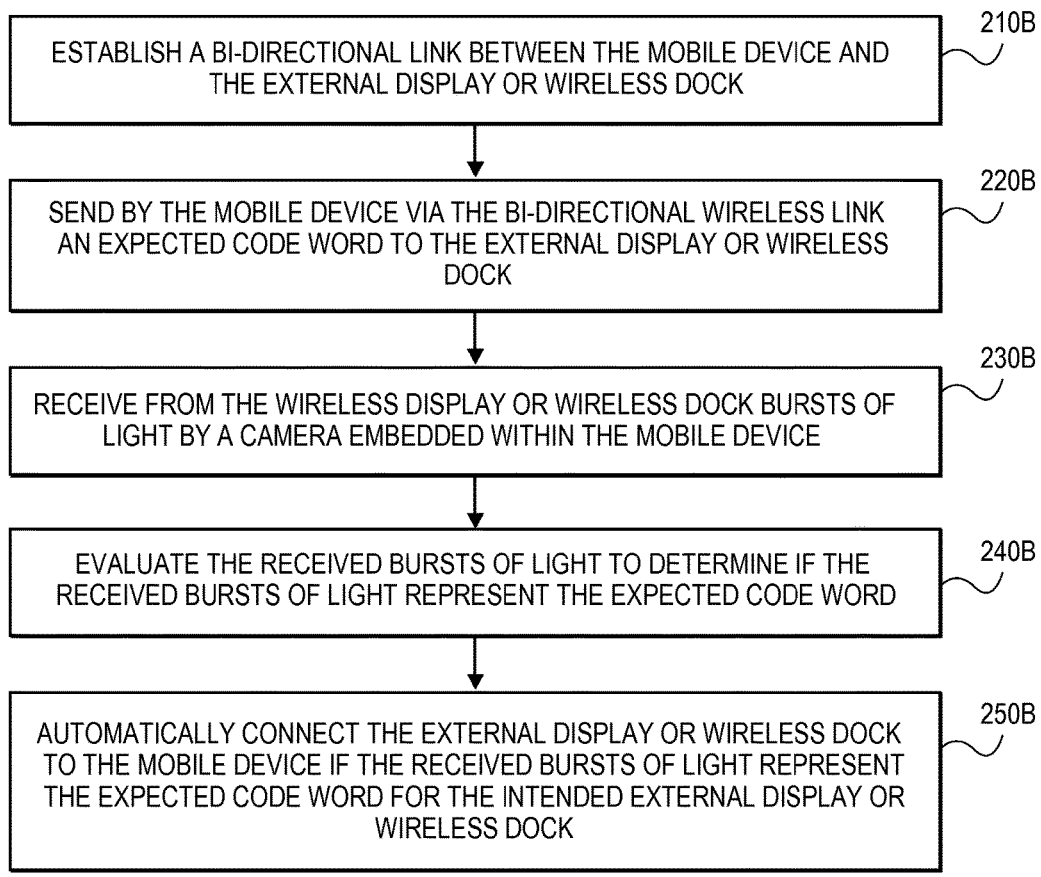
FIG. 2B illustrates as method of visual pairing and auto connecting for wireless display and wireless docking using coded bursts of light according to embodiments illustrated herein.

Further, as shown in reference to FIG. 2B, is a method to automatically connect a mobile device, such as the smartphone described with reference to FIG. 1 and FIG. 2, to an external display or wireless dock by establishing a bi-directional link between the mobile device and the external display or wireless dock 210B, sending by the mobile device 100 via the bi-directional wireless link an expected code word to the external display or wireless dock 220B, receiving from the wireless display or wireless dock bursts of light by a camera embedded within the mobile device 100 230B, and evaluating the received bursts of light to determine if the received bursts of light represent the expected code word 240B. At 250B, if the received bursts of light represent the expected code word for the intended external display or wireless dock, automatically connecting the external display or wireless dock to the mobile device 100.

Figure 3:
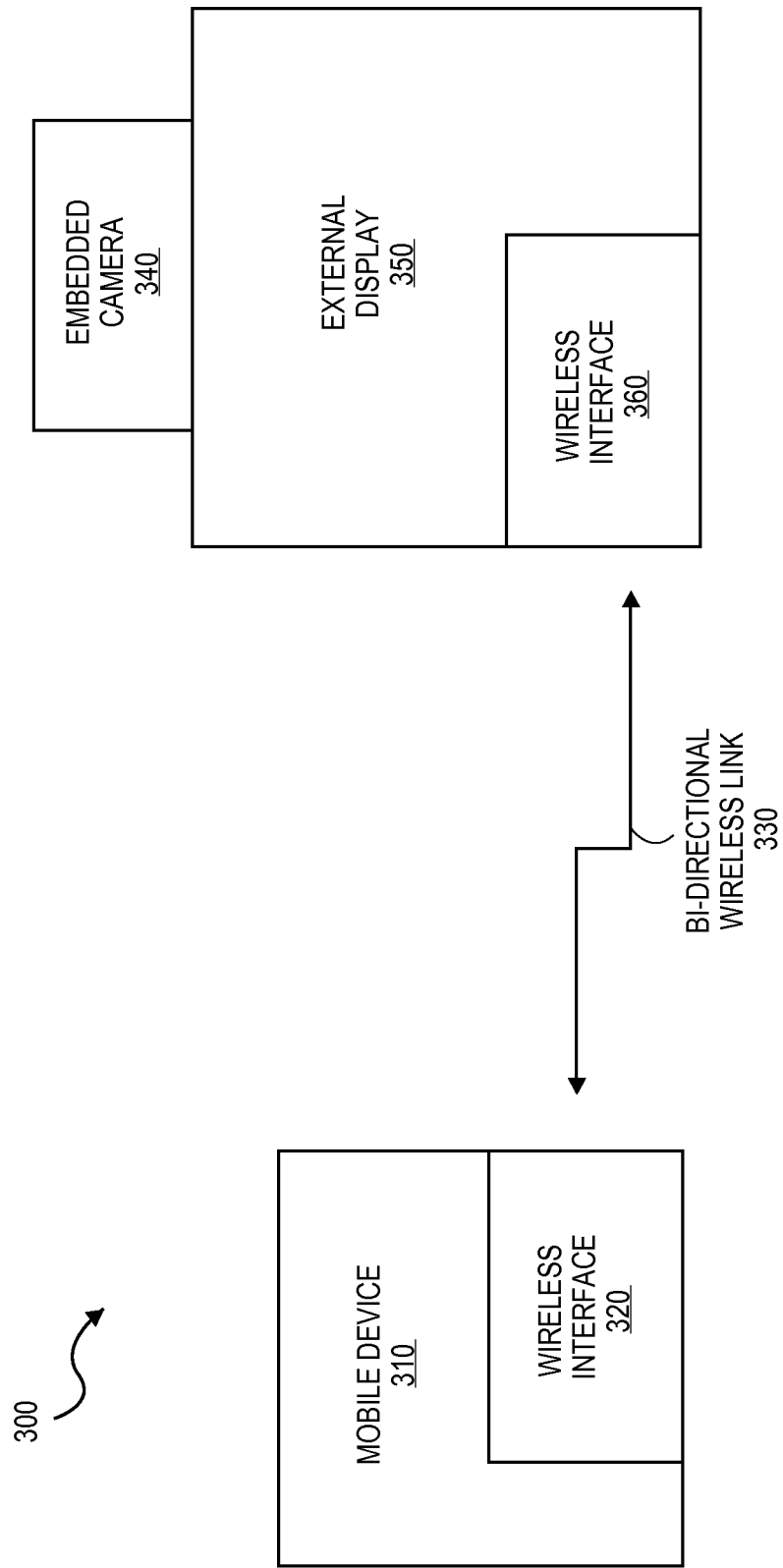
FIG. 3 is a block diagram illustrating visual pairing and auto connecting for wireless display and wireless docking using face recognition.

Turning now to FIG. 3 at 300 is a block diagram illustrating visual pairing and auto connecting for wireless display and wireless docking using face recognition. Mobile device 310 may establish via wireless interface 320 a bi-directional link 330 to external display/wireless dock 350 via wireless interface 360. It is understood that external display/wireless dock 350 can represent an external display or wireless dock or both. A camera 340 may be embedded with external display/wireless dock 350.

The mobile device 310 scans its environment and identified candidates to connect to. It may connect manually or automatically via the wireless interface 320 per the specific implementation and settings, but the assumption is that it is allowed to connect to more than one external display of wireless dock. The connected external display/wireless dock 350 turns on its embedded camera 340, takes an image and sends it to the mobile device 310 via wireless interface 360 thru the wireless link 330. The mobile device 310 analyzes the image, and only upon recognizing the face of the user enables the streaming of its screen to the external display/wireless dock 350. As long as the wireless link 330 is on, an embodiment provides that there is no need for re-identification.

Figure 4:
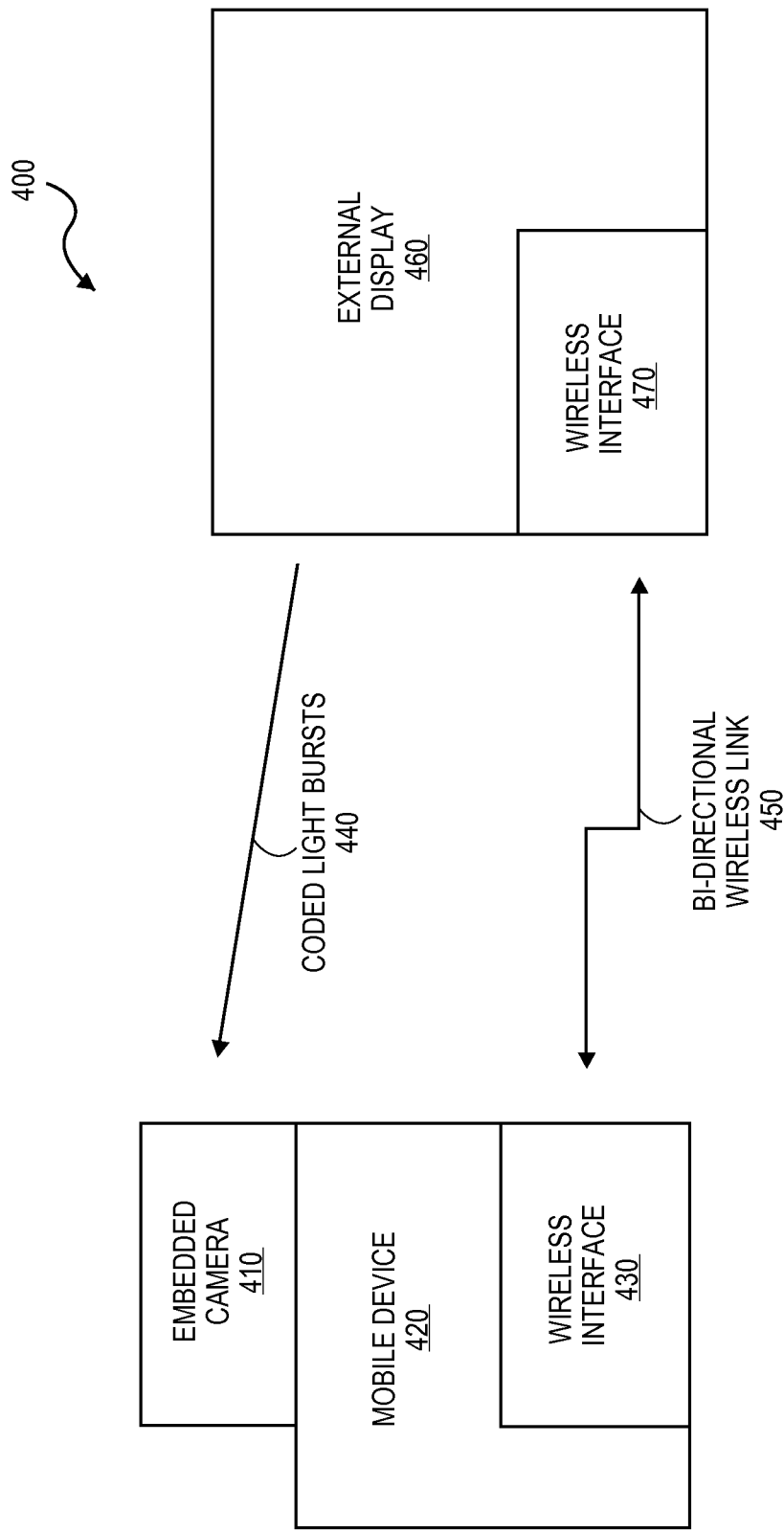
FIG. 4 is a block diagram illustrating visual pairing and auto connecting for wireless display and wireless docking using coded bursts of light.

FIG. 4 at 400 provides a block diagram illustrating visual pairing and auto connecting for wireless display and wireless docking using coded bursts of light. Mobile device 420 may establish via wireless interface 430 a bi-directional link 450 to external display/wireless dock 460 via wireless interface 470. It is understood that external display/wireless dock 460 can represent an external display or wireless dock or both. A camera 410 may be embedded with mobile device 420.

The external display/wireless dock 460, once connected to a mobile device 420, turns on, and displays a predefined burst of light 440 that is coded per the codeword sent by the mobile device 420 via wireless interface 430 and bi-directional link 450 to external display/wireless dock 460 via wireless interface 470. The mobile device camera 410 is turned on, and upon receiving the correct coded light burst 440, enables streaming to the external display/wireless dock 460.

Figure 5:
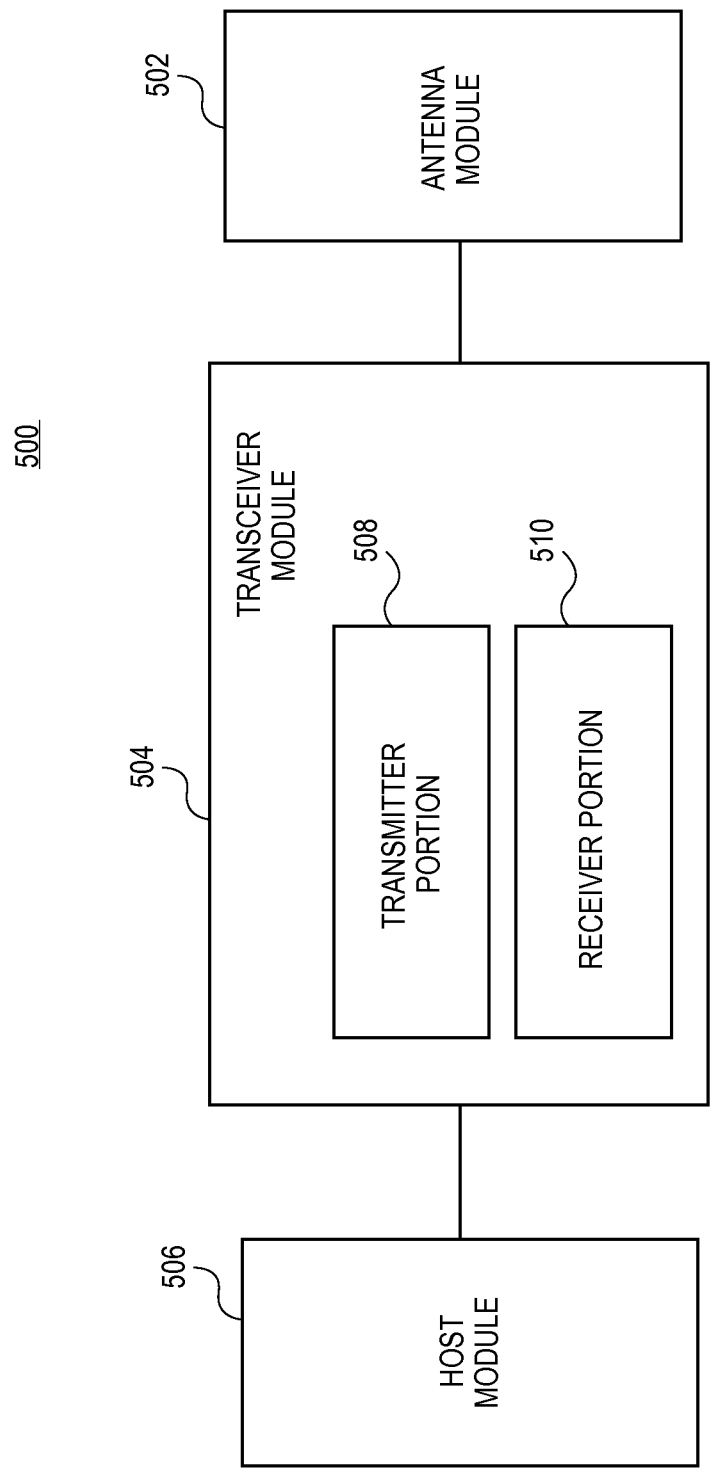
FIG. 5 is a block diagram of transceiver, host and antenna modules that may be used in embodiments herein illustrated to provide wireless functionality.

FIG. 5 is a diagram of an implementation 500 that may be included in a wireless device, such as a smartphone used in the present invention to provide wireless functionality. Device 300 may perform techniques, as described herein. As shown in FIG. 5, implementation 500 may include an antenna module 502, a transceiver module 504, and a host module 506. These elements may be implemented in hardware, software, or any combination thereof.

Antenna module 502 provides for the exchange of wireless signals with remote devices. Moreover, antenna module 502 may transmit wireless signals through one or more directional radiation patterns. Thus, antenna module 502 may include multiple antennas and/or multiple radiating elements (e.g., phased-array radiating elements).

Transceiver module 504 provides an interface between antenna module 502 and host module 506. For instance, transmitter portion 508 within transceiver module 504 receives symbols from host module 506 and generates corresponding signals for wireless transmission by antenna module 502. This may involve operations, such as modulation, amplification, and/or filtering. However, other operations may be employed.

Conversely, receiver portion 510 within transceiver module 504 obtains signals received by antenna module 502 and generates corresponding symbols. In turn, receiver portion 510 provides symbols to host module 506. This generation of symbols may involve operations, including (but not limited to) demodulation, amplification, and/or filtering.

The symbols exchanged between host module 506 and transceiver module 504 may form messages or information associated with one or more protocols, and/or one or more user applications. Thus, host module 506 may perform operations corresponding to such protocol(s) and/or user application(s). Further, exemplary protocols include various media access, network, transport and/or session layer protocols. Exemplary user applications include telephony, messaging, e-mail, web browsing, content (e.g. video and audio) distribution/reception, and so forth.

In addition, host module 506 may exchange control information with transceiver module 504. This control information may pertain to the operation and status of transceiver module 504. For instance, this control information may include directives that host module 506 sends to transceiver module 504. Such directives may establish operating parameters/characteristics for transceiver module 504. Also, this control information may include data (e.g., operational status information) that host module 506 receives from transceiver module 504.

As described above, transmitter portion 508 generates signals from symbols, and receiver portion 510 generates symbols from received signals. To provide such features, transmitter portion 508 and receiver portion 510 may each include various components, such as modulators, demodulators, amplifiers, filters, buffers, upconverters, and/or downconverters. Such components may be implemented in hardware (e.g., electronics), software, or any combination thereof.

The techniques described herein may be embodied in a computer-readable medium for configuring a computing system to execute the method. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

Computing systems may be found in many forms including but not limited to mainframes, minicomputers, servers, workstations, personal computers, notepads, personal digital assistants, various wireless devices and embedded systems, just to name a few. A typical computing system includes at least one processing unit, associated memory and a number of input/output (PO) devices. A computing system processes information according to a program and produces resultant output information via I/O devices.

Realizations in accordance with the present invention have been described in the context of particular embodiments. These embodiments are meant to be illustrative and not limiting. Many variations, modifications, additions and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the various configurations may be implemented as a combined structure or component. These and other variations, modifications, additions, and improvements may fall within the scope of the invention as defined in the claims that follow.

The invention claimed is:

1. A mobile device operable to automatically connect to an external display or wireless dock, comprising:
   a wireless interface configured to:
      establish a bi-directional link with the external display or wireless dock, and
      receive an image captured by a camera of the external display or wireless dock; and
   a processor configured to:
      evaluate the image to verify that the external display or wireless dock is an intended external display or wireless dock with which to connect to the mobile device, and
      enable streaming of content of a screen of the mobile device to the external display or wireless dock responsive to verification that the external display or wireless dock is the intended external display or wireless dock.

2. The mobile device of claim 1, wherein the mobile device is a smartphone, tablet or personal computer.

3. The mobile device of claim 2, further comprising:
   an application processor; and
   a touch screen with a touch screen controller interfaced with the application processor and capable of displaying information on the touch screen and external display when connected to the external display.

4. A mobile device operable to automatically connect to an external display or wireless dock, comprising:
   a wireless interface configured to:
      establish a bi-directional link with the external display or wireless dock, and
      send, via the bi-directional link, an expected code word to the external display or wireless dock;
   a camera embedded with the mobile device to receive bursts of light emitted by the external display or wireless dock, the bursts of light based on the expected code; and
   a processor configured to:
      determine whether the received bursts of light represent the expected code word, and in response to determining that the received bursts of light represent the expected code word, automatically connect with the external display or wireless dock.

5. The mobile device of claim 4, wherein the mobile device is a smartphone, tablet or personal computer.

6. The mobile of device of claim 5, further comprising: an application processor; and
a touch screen with a touch screen controller interfaced with the application processor and capable of displaying information on the touch screen and external display when connected to the external display.

7. An external display device operable to automatically connect to a mobile device, comprising:
a wireless interface configured to establish a bi-directional link with the mobile device;
a camera embedded with the external display device to capture an image responsive to, at least in part, establishing the bi-directional link with the mobile device, the external display device to send the image to the mobile device via the bi-directional link; and
wherein the external display device is configured to receive displayable information from the mobile device based on the mobile device determining that the the external display device is an intended external display device based on the image.

8. The external display device of claim 7, wherein the mobile device is a smartphone, tablet or personal computer.

9. The external display device of claim 8, wherein once the external display device is connected to the mobile device, it is configured to accept streaming from the mobile device.

10. The external display device of claim 7, wherein as long as the bi-directional link is established no further re-identification is required.

11. An external display device operable to automatically connect to a mobile device, comprising:
a wireless interface configured to:
establish a bi-directional wireless link with the mobile device, and
receive, via the bi-directional link an expected code word from the mobile device to associate with the mobile device; and
a light emitter adapted to send coded light bursts based on the expected code word, the coded light bursts configured to be received by a camera of the mobile device,
wherein the external display device is configured to automatically connect to the mobile device in response to determining, by the mobile device, that the bursts of light correspond to the expected code word.

12. The external display device of claim 11, wherein the mobile device is a smartphone, tablet or personal computer.

13. The external display device of claim 12, wherein once the external display device is connected to the mobile device, it is configured to accept streaming from the mobile device.

14. The external display device of claim 11, wherein as long as the bi-directional wireless link is established, no further re-identification is required.

15. A method to automatically connect a mobile device to an external display or wireless dock, comprising:
establishing a bi-directional link between the mobile device and the external display or wireless dock;
receiving an image at the mobile device from the external display or wireless dock via the bi-directional link, the image captured by the external display or wireless dock based, at least in part, on establishing the bi-directional link; and
evaluating the image by the mobile device to verify that the external display or wireless dock is an intended external display or wireless dock with which to connect to the mobile device,
enable streaming of content of a screen of the mobile device responsive to verification that the external display or wireless dock is the intended external display or wireless dock.

16. The mobile device of claim 15, wherein the mobile device is a smartphone, tablet or personal computer.

17. The method of claim 15, further comprising using an application processor in the mobile device to evaluate the image and using a touch screen with a touch screen controller interfaced with the application processor which is adapted to simultaneously display information on the touch screen and the external display when connected to the external display.

18. A method to automatically connect a mobile device to an external display or wireless dock, comprising:
establishing a bi-directional link between the mobile device and the external display or wireless dock;
sending by the mobile device via the bi-directional link an expected code word to the external display or wireless dock;
receiving, by a camera embedded within the mobile device, from the external display or wireless dock bursts of light, based, at least in part, on the expected code word; and
evaluating, by a processor of the camera, the bursts of light to determine whether the bursts of light represent the expected code word, and, in response to determining that the bursts of light represent the expected code word for an intended wireless display or wireless dock, automatically connecting the external display or wireless dock to the mobile device.

19. The method of claim 18, wherein the mobile device is a smartphone, tablet or personal computer.

20. The method of claim 18, comprising simultaneously displaying, by an application processor, information on a touch screen of the mobile device and the external display when connected to the external display.

* * * * *